ized at a rotation center portion of the holder, and is fixed to the main body section such that the magnetic detecting element intersects a magnetic flux of the magnet, and which detects a magnetic change generated with displacement of the magnet and converts the change into electrical signals. The liquid surface detecting apparatus detects the liquid surface on the basis of the electrical signals transmitted from the magnetic detecting element. The arm is fixed to the outside of the magnet of the holder, and a part of a cross-section in the direction perpendicular to the longitudinal direction of the arm fixed to the holder is positioned between an upper end and a lower end in the rotation axis direction of the magnet.

United States Patent
Ogasawara

(10) Patent No.: US 9,453,756 B2
(45) Date of Patent: Sep. 27, 2016

(54) LIQUID SURFACE DETECTING APPARATUS

(71) Applicant: NIPPON SEIKI CO., LTD., Niigata (JP)

(72) Inventor: Yukio Ogasawara, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 239 days.

(21) Appl. No.: 14/369,593

(22) PCT Filed: Dec. 5, 2012

(86) PCT No.: PCT/JP2012/081548
§ 371 (c)(1),
(2) Date: Jun. 27, 2014

(87) PCT Pub. No.: WO2013/099544
PCT Pub. Date: Jul. 4, 2013

(65) Prior Publication Data
US 2015/0000398 A1    Jan. 1, 2015

(30) Foreign Application Priority Data
Dec. 28, 2011  (JP) .................. 2011-288670

(51) Int. Cl.
*G01F 23/38*    (2006.01)

(52) U.S. Cl.
CPC ..................... *G01F 23/38* (2013.01)

(58) Field of Classification Search
CPC .......... G01D 5/12; G01B 7/30; G01F 23/36; G01F 23/38
See application file for complete search history.

(56) References Cited

U.S. PATENT DOCUMENTS 6,483,296 B1    11/2002  Hamaoka et al.
7,703,322 B2 *   4/2010  Yasuda .................. G01F 23/38
                                              73/313

(Continued)

FOREIGN PATENT DOCUMENTS

JP    2001-4315 A      1/2001
JP    2002-206959 A    7/2002

(Continued)

OTHER PUBLICATIONS

Extended European Search Report dated Jul. 31, 2015 issued in European Patent Application No. 12862769.2.

(Continued)

*Primary Examiner* — Francis Gray
(74) *Attorney, Agent, or Firm* — McDermott Will & Emery LLP

(57) ABSTRACT

Provided is a thin liquid surface detecting apparatus wherein a thickness of a holder is suppressed. A liquid surface detecting apparatus is provided with: a holder rotatably held to a main body section; a magnet fixed to the holder; an arm, which connects the holder and a float floating on the liquid surface of a liquid, and which converts an up-and-down motion of the float into a rotation motion of the holder; and a magnetic detecting element, which is positioned at a rotation center portion of the holder, and is fixed to the main body section such that the magnetic detecting element intersects a magnetic flux of the magnet, and which detects a magnetic change generated with displacement of the magnet and converts the change into electrical signals. The liquid surface detecting apparatus detects the liquid surface on the basis of the electrical signals transmitted from the magnetic detecting element. The arm is fixed to the outside of the magnet of the holder, and a part of a cross-section in the direction perpendicular to the longitudinal direction of the arm fixed to the holder is positioned between an upper end and a lower end in the rotation axis direction of the magnet.

4 Claims, 4 Drawing Sheets

(56) References Cited

U.S. PATENT DOCUMENTS

| | | | |
|---|---|---|---|
| 2005/0083045 A1* | 4/2005 | Miyagawa | G01F 23/38 324/207.25 |
| 2005/0103103 A1 | 5/2005 | Newman et al. | |
| 2005/0166674 A1* | 8/2005 | Kogure | G01F 23/38 73/314 |
| 2007/0090832 A1* | 4/2007 | Yasuda | G01F 23/38 324/207.25 |
| 2008/0231267 A1* | 9/2008 | Miyagawa | G01F 23/38 324/207.25 |
| 2011/0036165 A1* | 2/2011 | Fukuhara | G01F 23/38 73/317 |
| 2012/0285240 A1* | 11/2012 | Yasuda | G01F 23/38 73/313 |

FOREIGN PATENT DOCUMENTS

| | | | |
|---|---|---|---|
| JP | 2004-333283 A | | 11/2004 |
| JP | 2005-10047 A | | 1/2005 |
| JP | 2005010047 A | * | 1/2005 |
| JP | 2006-153615 A | | 6/2006 |
| JP | 2009-271013 A | | 11/2009 |
| JP | 2012233747 A | * | 11/2012 |

OTHER PUBLICATIONS

International Search Report issued in Application No. PCT/JP2012/081548 dated Jan. 8, 2013.
Chinese Examination Report dated Feb. 19, 2016 issued in Chinese Patent Application No. 201280064384.2.

* cited by examiner

LIQUID SURFACE DETECTING APPARATUS

CROSS-REFERENCE TO RELATED APPLICATIONS

The present application is the U.S. National Phase of PCT/JP2012/081548 filed Dec. 5, 2012 which claims priority from Japanese Patent Application No. 2011-288670 filed Dec. 28, 2011; the subject matter of each is incorporated herein by reference in entirety.

TECHNICAL FIELD

The present invention relates to a liquid surface detecting apparatus for detecting a liquid surface of a liquid such as a fuel in a tank.

BACKGROUND ART

A conventionally liquid surface detecting apparatus was provided with: a float which floats on a liquid surface of a liquid; a holder rotatably held on a main body section; a cylindrical magnet fixed to this holder so as to be coaxial to a rotation axis of the holder; an arm which connects the float and the holder, and which converts an upward and downward movement of the float to a rotational motion of the holder; and a magnetic detecting element which is positioned at a substantial rotation center portion of the holder, and is fixed to the main body section, and which detects a magnetic change generated with displacement of the magnet and converts the change into an electrical signal and then output the converted electrical signal, the apparatus detecting the liquid surface on the basis of the electric signal from the detecting element (for example, refer to Patent Literature 1).

CITATION LIST

Patent Literature

Patent Literature 1: Japanese Unexamined Patent Application Publication No. 2004-333283

SUMMARY OF THE INVENTION

Problems to be Solved by the Invention

However, a structure of fixing the arm to the holder is a structure of inserting an end part of the arm in a rotation axis direction of the holder, and therefore, the conventional apparatus has entailed a problem that the holder becomes thick in the rotation axis direction thereof.

Accordingly, it is an object of the present invention to provide a thin liquid surface detecting apparatus in which a thickness of a holder is suppressed.

Means for Solving the Problem

A liquid surface detecting apparatus of the present invention is provided with a holder rotatably held to a main body; a magnet fixed to the holder; an arm, which connects the holder and a float floating on the liquid surface of a liquid, and which converts an up-and-down motion of the float into a rotation motion of the holder; and a magnetic detecting element, which is positioned at a rotation center portion of the holder, and is fixed to the main body section such that the magnetic detecting element intersects a magnetic flux of the magnet, and which detects a magnetic change generated with displacement of the magnet and converts the change into electrical signals, and in the liquid surface detecting apparatus detecting the liquid surface on the basis of the electrical signals from the magnetic detecting element, the arm is fixed to the outside of the magnet of the holder, and a part of a cross-section in a direction perpendicular to a longitudinal direction of the arm fixed to the holder is positioned between an upper end and a lower end in a rotation axis direction of the magnet.

Further, the cross-section in the direction perpendicular to the longitudinal direction of the arm fixed to the holder is positioned between the upper end and the lower end in the rotation axis direction of the magnet.

Further, a first mounting section fixing a float side of the arm is provided at the holder.

Further, a second mounting section fixing a side opposite to the side on which the float of the arm has been provided, is provided at the holder.

Effects of the Invention

The present invention can provide a thin liquid surface detecting apparatus in which a thickness of a holder is suppressed.

MODES FOR CARRYING OUT THE INVENTION

Figure 1:
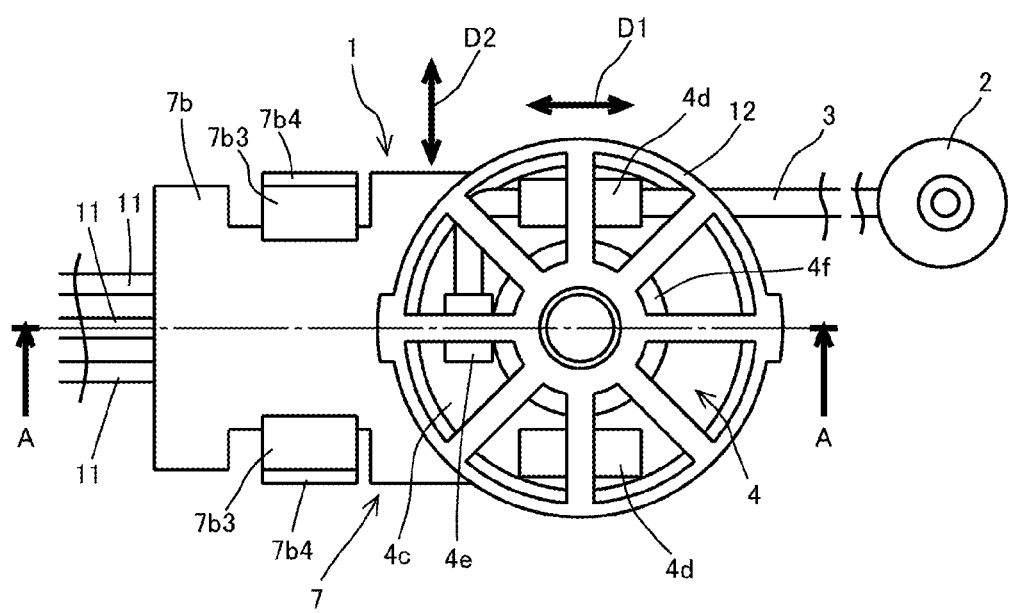
FIG. 1 is a top view of a liquid surface detecting apparatus of a first embodiment of the present invention.

Hereinafter, a first embodiment of the present invention will be described with reference to the accompanying drawings.

A liquid surface detecting apparatus 1 of the present invention is provided with: an arm 3 having a float 2 at one end thereof, a holder 4; a magnet 5; a magnetic detecting element 6; and a main body section 7. It is to be noted that reference numeral 10 designates a lead terminal, reference numeral 11 designates an electrical connecting member; and reference numeral 12 designates a cover.

The float 2 floats on a liquid surface of a liquid such as a liquid fuel, is actuated with the displacement of the liquid surface, and in the embodiment, this float is formed of a corrosion resistant metal such as stainless steel. It is to be noted that a material for the float 2 is not limitative to that in the embodiment, and may be formed of a synthetic resin or the like.

The arm 3 is formed of a nonmagnetic metal; holds the float 2 at one end thereof and is mounted to the holder 4 at the other end thereof, and connects the float 2 and the holder 4 and converts an up-and-down motion generated by displacement of a liquid surface of the float 2 into a rotation motion of the holder 4.

The holder 4 is made of a synthetic resin, and is rotatably held by the main body section 7 and the cover 12. Further, this holder holds the arm 3 to the magnet 5. The magnet 5 is fixed so that a rotation axis L thereof is coaxial to the rotation axis of the holder 4.

The holder 4 is provided with a cylinder section 4a, and inside of the cylinder section 4a, the magnet 5 is included.

Further, at a central part on a one end side (an upper side in FIG. 2) of the cylinder section 4a of the holder 4, a column section 4b is provided, this column section 4b is provided with a bearing 4d which is made of a depressed portion which is rotatably supported by a spindle section to be described later, of the main body section 7, and the holder 4 is rotatably supported at the main body section 7.

Further, the holder 4 is provided with a disk-shaped flange section 4c which is formed to extend in an outer circumferential direction to the other end side of the cylinder section 4a. This flange section 4c is provided with a first mounting section 4d and a second mounting section 4e. The first mounting section 4d and the second mounting section 4e are provided outside of the magnet 5 of the holder 4.

The first mounting section 4d fixes the float 2 side of the arm 3 to the holder 4, and in the embodiment, the first mounting sections 4d are provided in one pair, and while one of these two mounting sections is selected, the arm 3 is fixed. This mounting section, although a cross-sectional shape thereof is not shown, is formed in a C-shape which conforms to a sectional shape of the arm 3, a cutout is partially provided, and through the cutout, the arm 3 is inserted and fixed.

The second mounting section 4e, in the embodiment, fixes a side opposite to the side on which the float 2 of the arm 3 that is folded at a substantially right angle has been provided, and although not shown, the second mounting section 4e is a through hole, and into this hole, the arm 3 is inserted and fixed.

A longitudinal direction of the arm 3 that is fixed to the holder 4 is a direction perpendicular to the direction of the rotation axis L of the magnet 5. In particular, a portion of the arm 3 that is fixed to the first and second mounting sections 4d and 4e of the holder 4 is oriented in the direction perpendicular to the direction of the rotation axis L of the magnet 5.

It is to be noted that reference numeral 4f designates a shield case, and this shield case protects the magnetic detecting element 6 from an external magnetic field, is made of an iron-nickel alloy, for example, and is provided with a cylinder section 4f1 and a flange section 4f2. The flange section 4f2 protrudes to the inside of the cylinder section 4f1, is provided with a hole through which the column section 4b of the holder 4 passes, and is provided so as to cover the cylinder section 4a of the holder 4.

Figure 2:
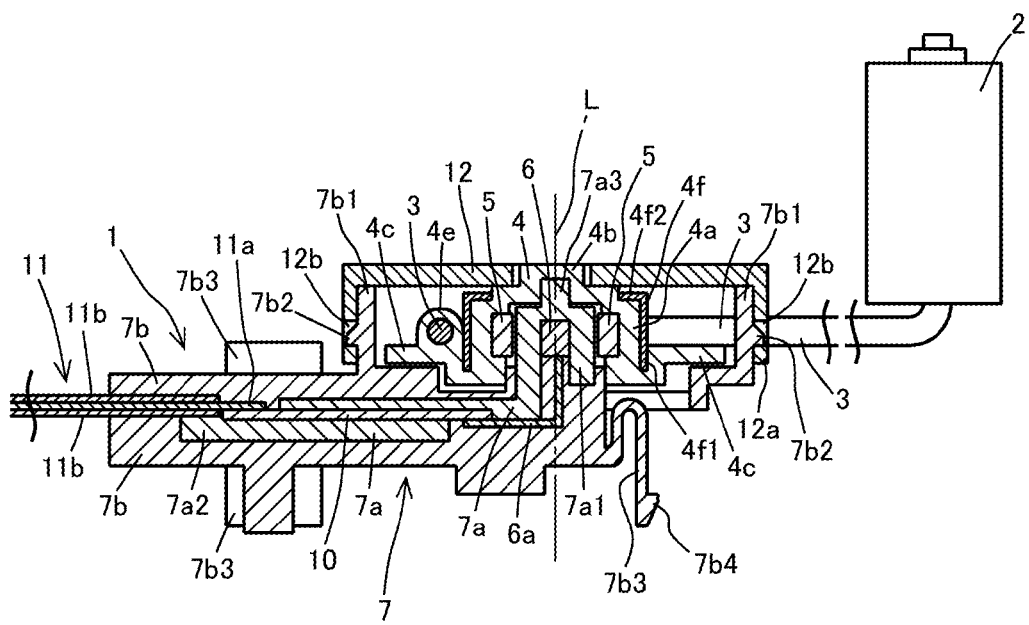
FIG. 2 is a sectional view taken along the line A-A in FIG. 1.

On an upper side in FIG. 2 of the holder 4, a cover 12 is arranged, and an engaging piece 12s having an engaging hole 12b which is provided in the cover 12 is engagingly locked to the main body section 7, whereby the cover 12 is fixed.

The magnet 5 is formed in a cylindrical shape, is magnetized in a bipolar manner, and is formed integrally with the holder 4 by means of insert molding or the like at the same time of molding of the holder 4. The magnet 5 is fixed so that the rotation axis L of the magnet 5 is positioned to be coaxial to a rotation axis of the holder 4. The magnet 5 is disposed so as to be opposed to an outer circumference of an arrangement section to be described later, of the main body section 7, and is arranged so as to surround the magnetic detecting element 6. The magnet 5 turns concurrently with actuation of the arm 3.

The magnetic detecting element 6 is made of a magnetic detecting element such as a Hall effect device, for example, is positioned at a rotation center portion of the holder 4, and is fixed to the main body section 7 so as to cross a magnetic flux of the magnet 5. This detecting element detects a magnetic change generated by displacement of rotation of the magnet 5, and outputs an electric signal which is the thus detected signal. It is to be noted that, as the magnetic detecting element 6, for example, a magnetic detecting element such as an MR element may be employed. The magnetic detecting element 6 is arranged at the main body section 7, and a lead 6a of the magnetic detecting element 6 is electrically connected to a lead terminal 10 and an electrical connecting member 11. The lead 6a, the lead terminal 10 and the electrical connecting member 11 are electrically connected to each other by means of soldering connection or the like.

The main body section 7 is composed of a first main body section 7a and a second main body section 7b. The first main body section 7a and the second main body section 7b both are made of a synthetic resin, for example, a synthetic resin such as polyacetal (POM). The first main body section 7a is provided with: an arrangement section 7a1 which houses and holds the magnetic detecting element 6; and a body section 7a2 which incorporates the lead terminal 10.

The arrangement section 7a1 is formed in a cup shape, and inside of this cup shape, the magnetic detecting element 6 is housed. Further, the arrangement section 7a1, in its external view, is formed in a columnar shape, and at an upper end thereof, a spindle section 7a3 which rotatably supports the holder 4 is provided. The body section 7a2 is formed in a flat shape, and incorporates the lead terminal 10 by means of insert molding.

The second main body section 7b covers a part of the first main body section 7a, the magnetic detecting element 6, the lead terminal 10, and a part of the electric connecting member 11, by means of insert molding.

The second main body section 7b is provided with a protrusion piece 7b1 at the periphery of the holder 4. This protrusion piece 7b1 is provided with an engagingly locking claw 7b2. This engagingly locking claw 7b2 is engagingly locked to an engaging hole 12b of the cover 12, whereby the cover 12 is fixed to the main body section 7.

Further, the second main body section 7b is provided with three elastic pieces 7b3, each of which has an engagingly locking claw 7b4, in order to fix the liquid surface detecting apparatus 1 to a mounting piece or a fuel pump or the like which is not shown.

The lead terminal 10 is made of a metal, and is formed in a flat elongated shape.

The electrical connecting member 11, in the embodiment, is a lead wire, and is composed of: a conductor 11a with a good electrical conductivity such as copper; and an insertion film 11b which covers this conductor 11a. The conductor 11a of the lead wire 11 is electrically connected to the lead terminal 10.

Figure 3:
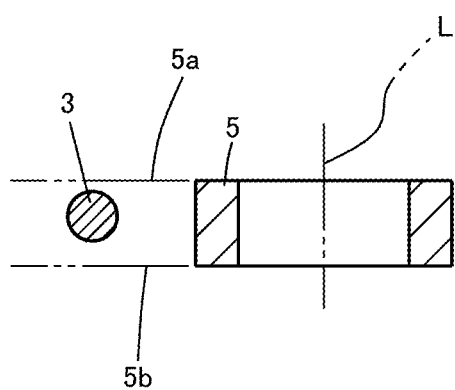
FIG. 3 is a sectional view showing a positional relationship between a magnet and an arm.

In the embodiment, as shown in FIGS. 1 to 3, outside of the magnet 5 of the holder 4, the arm 3 is fixed at the first and second mounting sections 4d and 4e, and the cross-section in the direction perpendicular to longitudinal direction D1 or D2 of the arm 3 that is fixed to the holder 4 is positioned between the upper end 5a and the lower end 5b in the direction of the rotation axis L of the magnet 5. With the construction as described above, there can be provided a thin liquid surface detecting apparatus 1 in which a thickness of the holder 4 is suppressed.

Figure 4:
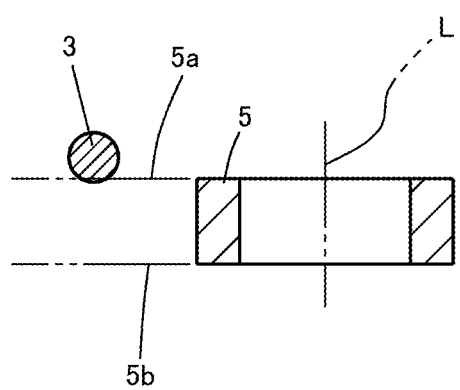
FIG. 4 is another sectional view showing a positional relationship between the magnet and the arm.

A position of the cross-section in the direction perpendicular to the longitudinal direction D1 or D2 of the arm 3 is not limitative to the embodiment, and for example, as shown in FIG. 4, a part of the cross-section in the direction perpendicular to the longitudinal direction D1 or D2 of the arm 3 may be positioned between the upper end 5a and the lower end 5b in the direction of the rotation axis L of the magnet 5. With the construction as described above as well, there can be provided the thin liquid surface detecting apparatus 1 in which the thickness of the holder 4 is suppressed.

INDUSTRIAL APPLICABILITY

The present invention is applicable to a liquid surface detecting apparatus for detecting liquid surfaces of various kinds of liquids in tanks.

DESCRIPTION OF REFERENCE NUMERALS

1 Liquid surface detecting apparatus
2 Float
3 Arm
4 Holder
4a Cylinder section
4b Column section
4c Flange section
4d First mounting section
4e Second mounting section
4f Shield case
4f1 Cylinder section
4f2 Flange section
5 Magnet
5a Upper end
5b Lower end
6 Magnetic detecting element
6a Lead
7 Main body section
7a First main body section
7a1 Arrangement section
7a2 Body section
7a3 Spindle section
7b Second main body section
7b1 Protrusion piece
7b2 Engagingly locking claw
7b3 Elastic piece
7b4 Engagingly locking claw
10 Lead terminal
11 Electrical connecting member
11a Conductor
11b Insulation film
12 Cover
12a Engaging piece
12c Engaging hole
L Rotation axis

The invention claimed is:

1. A liquid surface detecting apparatus comprising:
a float for floating on a liquid surface of a liquid;
a main body;
a holder, having a magnet, rotatably attached to the main body, the holder with the magnet rotating around a rotation axis, the magnet having a first surface perpendicular to the rotation axis, a second surface opposite to the first surface, and an outer circumferential surface between the first surface and the second surface and parallel to the rotation axis;
an arm connecting the holder and the float for converting an up-and-down motion of the float on the liquid surface into a rotation motion of the holder, the arm at least partially extending in a region around the outer circumferential surface of the magnet, a longitudinal axis of the arm extending in the region and being perpendicular to the rotation axis, the region being defined by a first hypothetical plane extending from the first surface and a second hypothetical plane extending from the second surface; and
a magnetic detecting element fixed to a position of the main body where the magnetic detecting element intersects a magnetic flux of the magnet to detect a magnetic change generated with displacement of the magnet and convert the magnetic change into an electrical signal, wherein
the liquid surface detecting apparatus detecting a liquid surface of the liquid on a basis of the electrical signal from the magnetic detecting element.

2. The liquid surface detecting apparatus according to claim 1, wherein the arm extends within the region.

3. The liquid surface detecting apparatus according to claim 1, wherein a first mounting section fixes the arm to the holder at a first section of the arm that is proximate to the float.

4. The liquid surface detecting apparatus according to claim 1, wherein a second mounting section fixes the arm to the holder at a second section of the arm that is distal to the float and is provided at the holder.

* * * * *